Dec. 19, 1961  L. G. SIMJIAN  3,013,343
TRAINING DEVICE FOR MOTOR VEHICLE OPERATORS
Filed Dec. 4, 1957  3 Sheets-Sheet 1

INVENTOR.
LUTHER G. SIMJIAN
BY
Erwin B. Steinberg
AGENT.

Dec. 19, 1961   L. G. SIMJIAN   3,013,343
TRAINING DEVICE FOR MOTOR VEHICLE OPERATORS
Filed Dec. 4, 1957   3 Sheets-Sheet 2
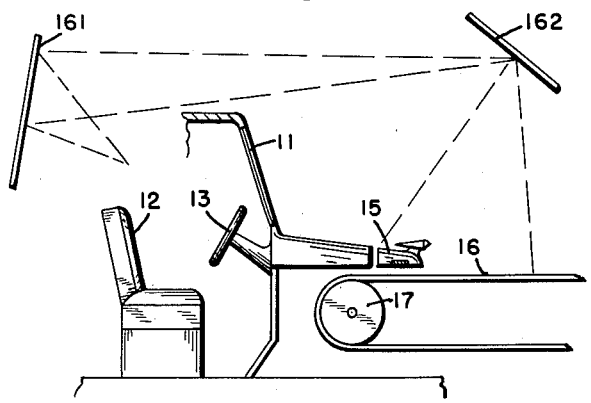
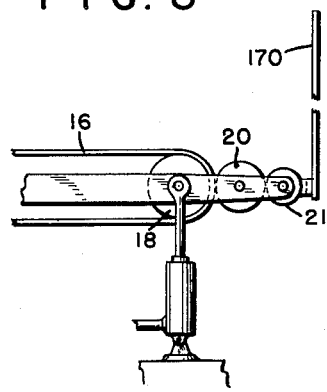
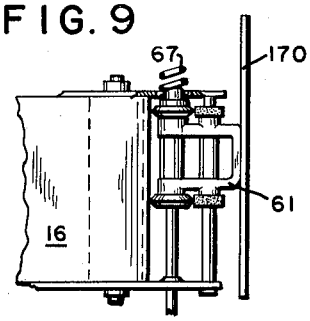
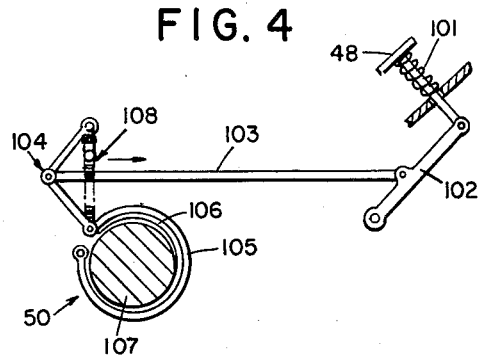
INVENTOR.
LUTHER G. SIMJIAN
BY
AGENT Dec. 19, 1961    L. G. SIMJIAN    3,013,343
TRAINING DEVICE FOR MOTOR VEHICLE OPERATORS
Filed Dec. 4, 1957    3 Sheets-Sheet 3

INVENTOR.
LUTHER G. SIMJIAN
BY
AGENT.

United States Patent Office 3,013,343
Patented Dec. 19, 1961

3,013,343
TRAINING DEVICE FOR MOTOR VEHICLE
OPERATORS
Luther G. Simjian, Greenwich, Conn., assignor to Reflectone Electronics, Inc., Stamford, Conn., a corporation of Connecticut
Filed Dec. 4, 1957, Ser. No. 700,648
8 Claims. (Cl. 35—11)

This invention generally refers to improvements in training devices and has particular reference to a novel and useful means for training, testing, analyzing and recording the actions and reactions of persons in operating certain control mechanisms. More specifically, the invention is related to a classroom training device adapted to present varying visual stimuli to a trainee position or station and wherein controls at the trainee position may be used to modify certain programmed sequences.

The invention specifically is directed to providing a novel and useful mechanism for teaching persons the handling of power operated vehicles, such as automobiles, boats, airplanes, etc. While the primary object of this training device is the training and instructing of novices, it will be found that the device is equally useful for evaluating the capability and proficiency of drivers possessing already a certain amount of experience and skill. In this manner, the instant training device, as will be apparent from the following description, constitutes an extremely valuable and versatile tool for the ever increasing demand and need for driver education and evaluation.

The recent rapid increase in moving vehicles and the alarming rise of the accident rate with the resultant loss to human life and property has focussed renewed attention on the problem of driver education and driver evaluation and pointed out the need for an apparatus which in a realistic manner would serve to teach and evaluate a driver in his actions and reactions when operating a power-driven vehicle. Such an apparatus in order to be useful must be suitable in connection with driver teaching classes where either a single or a plurality of students is trained.

Although the prior art shows various trainers of this type, many of the prior art devices known and evaluated exhibit severe shortcomings, such as inadequate realism and lack of realistic presentation with regard to wrong actions by an individual student, specifically when group training is involved.

The instant application discloses a trainer which has been designed to overcome the above mentioned shortcomings by providing realism not only to each single student but by designing the trainer in such a manner that it may be used equally well for group training. The trainer is entirely a self-contained unit which is readily transportable for classroom use. Several trainers in parallel may be used in a single installation without affecting the training value at each single station. To this end, the invention provides a trainer which tests the ability of an individual to handle the vehicle controls under numerous situations, these situations occurring on a programmed or random schedule.

In conformity with the foregoing, in its present and preferred embodiment the invention provides a trainee position which is equipped with the usual vehicle controls—in the case of an automobile—steering wheel, gear shift, brake, clutch and accelerator pedals. In front of the trainee position there is disposed a small object which represents a portion of the automobile which the trainee is controlling. A terrain presentation, for instance an endless belt, moves relative to the object, the speed of the belt relative to the object and the lateral position of the object relative to the belt are controlled by the trainee. Means are provided to cause a continuously changing road pattern on the belt. It is the trainee's problem to steer the object in such a manner that the boundaries of the roadway on the belt are not exceeded. The longitudinal speed of the belt is adjustable by the instructor and may be influenced still further by the controls at the trainee position.

Another feature of the present invention concerns the provision of making visual stimulus means available to the trainee by projection techniques. Moreover, a common projection screen may be used by a plurality of students by the use of suitable optical means. In this manner when using projection means valuable floor area may be conserved.

One of the objects of this invention is therefore the provision of a novel and improved training device which is useful for teaching and evaluating persons in the operation and handling of power driven vehicles.

Another object of this invention is the provision of a self-contained trainer readily operable in single or plural units.

Another object of this invention is the provision of a driving trainer which presents to a student realistic conditions so as to cause the student to acquire driving skill and proficiency.

Another object of this invention is the provision of a vehicle training device in which the actions taken by the student are apparent to the student at once regardless as to whether individual or group training is involved.

A further object of this invention is the provision of a training device which is equipped with means to present variable and varying road path patterns to the student.

A further object of this invention is the provision of a driving trainer in which certain characteristics of an actual vehicle are simulated.

A still further object of this invention is the provision of a training device provided with projection means to present certain visual stimulus means.

Further and still other objects of the instant invention will be apparent from the following description taken in conjunction with the accompanying drawings in which:

FIGURE 4 is an elevational view, partly in section, of the brake mechanism;

FIGURE 7 is an elevational view of a portion of the instant training device showing means for providing training when steering a vehicle in backward direction;

FIGURE 8 is a side view of a portion of the training device provided with additional scenery, and FIGURE 9 is a plan view of FIGURE 8.

Figure 1:
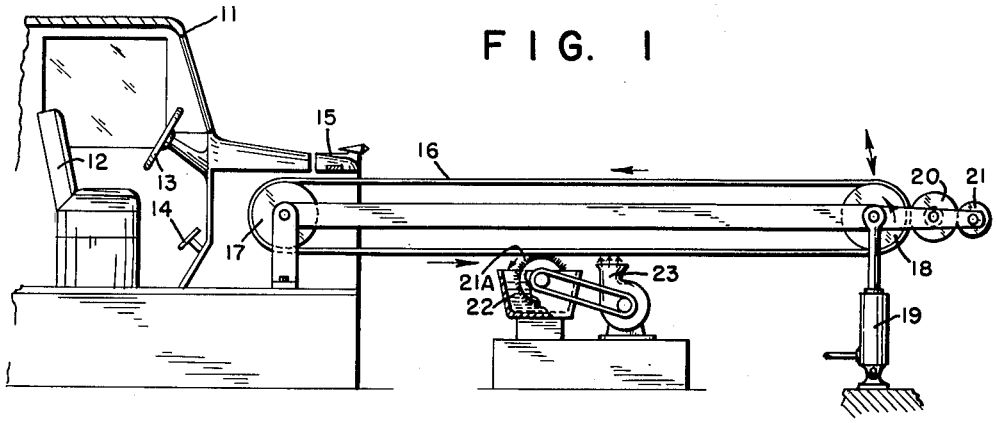
FIGURE 1 is a view in longitudinal section, partly schematic, of the training device.

Referring now to the figures and FIGURE 1 in particular, numeral 11 identifies a trainee position such as the cab of an automobile which is to be occupied by the student. It will be apparent that such a student position may resemble the operator's position on a ship, aircraft, etc. without departing from the scope of the instant invention. Within this cab there will be found a seat 12, a steering wheel 13, and suitable foot pedals 14.

In view of the trainee's position there is disposed a portion of the vehicle such as the front portion of a hood 15 which may include a hood ornament. This hood portion, or object, is distinct from the cab 11 and is movable laterally with respect to a moving endless belt 16 disposed in front and below the object 15. The endless belt 16 represents visual stimulus means in the form of road information and moves longitudinally toward the object 15.

The terrain belt 16 is driven about spaced rollers 17 and 18 at a speed which represents driving speed. The center axis of roller 18 is supported by means of an elevating mechanism, for instance, a hydraulic cylinder 19 so that the belt at the far end (roller 18) may be tilted upward or downward with respect to object 15 and cab 11 to simulate upgrade or downgrade road conditions. The lateral or transverse motion of object 15 relative to the longitudinal axis of belt 16 is controlled from steering wheel 13. One of the objects of this trainer is to impart steering skill to the student. To this end, cooperating with the belt there is a set of marking rollers 20 which receive a suitable marking liquid from a set of ink rollers 21. Each marking roller 20 is in contact with the belt at roller 18 and is used to mark a lateral boundary representing the limit of a roadway on the belt. After the marking has passed object 15, the marking becomes erased by cleaning means which include a rotary brush 21A revolving in a suitable cleaning solution 22 followed by a hot air drying device 23.

It will be apparent that such marking may comprise pencil marking, inking means, application of magnetic powder, marking by means of heat, application and removal of adhesive tape or similar means without deviating from the principle of the invention.

Figure 2:
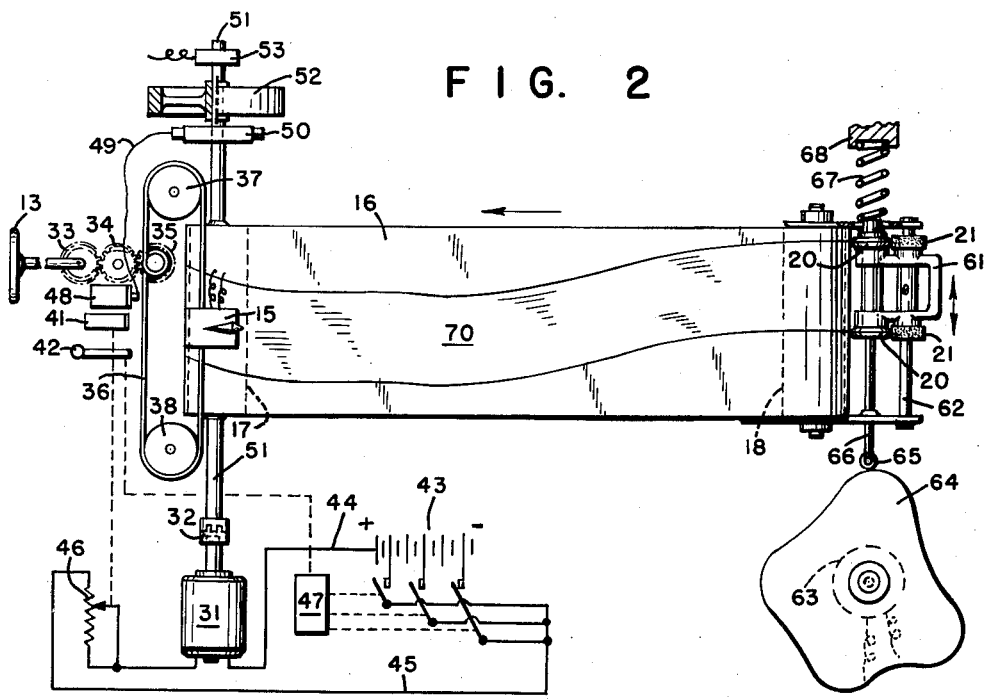
FIGURE 2 is a plan view of the training device illustrating more closely portions of FIGURE 1.

FIGURE 2 illustrates more closely some of the mechanisms and components involved in operating the device per FIGURE 1. Motor 31 drives the road belt via a coupling 32 and roller 17 about which the endless belt 16 rotates. Belt 16 may be made of fabric, impregnated fabric, plastic material, so that the belt is readily flexible as well as capable of being marked repetitively with road boundaries. The steering wheel 13 via a set of suitable gears 33, 34, and 35 drives a flexible cable 36 which is fastened around the side of gear 35. The flexible cable 36 after being guided about pulleys 37 and 38 is fastened to object 15 so that motion of steering wheel 13 causes a corresponding lateral or transverse motion of object 15 relative to the belt 16.

The speed of driving motor 31 is influenced by the accelerator pedal 41 and gear shift lever 42. Motor 31 is driven from a source of electric energy 43 via conductor 44, a series of toggle switches in parallel, conductor 45 and via adjustable resistor 46. The three switches shown represent first, second and third gear shift position on an automobile and it will be understood that one switch at a time is closed. The switches are actuated by gear shift lever 42 engaging a suitable cam device 47 which in turn closes one of the three toggle switches. It will be seen that the switches, from left to right, pick up increasing voltage so that maximum voltage represents the highest speed gear in an automobile. Rheostat 46 is controlled by the accelerator pedal 41 to simulate the action of the gas pedal in an automobile. It will be apparent that the rheostat 46 may be a shaped function potentiometer to simulate actual characteristics of an engine. For the sake of simplicity the clutch pedal is not shown but it readily can be coupled to cam means 47. It will be apparent to those skilled in the art that as an alternate design actual mechanical gear ratios and gear shifting means may be employed which are coupled between the motor and the roller 17 without departing from the principle shown.

The brake pedal 48 via a flexible cable 49 controls a brake disk and brake shoe arrangement 50 operatively coupled to drive shaft 51 so that operation of brake pedal 48 causes a braking action on drive shaft 51 which is driven by motor 31. Drive shaft 51 still further is provided with an inertia means, flywheel 52, in order that the belt cannot be slowed or accelerated suddenly, but that the motion of the road belt relative to the object 15 is provided with suitable inertia which represents the dynamic characteristics of a moving vehicle. Moreover, an inertia switch 53 in a similar manner is fastened to the drive shaft 51, this inertia switch causing an electrical circuit contact operation during sudden mechanical acceleration or deceleration of the shaft 51. This contact operation is used for scoring purposes to indicate whether sudden acceleration or deceleration due to improper operation of the driving controls has occurred. Switches of this type are well known in the art in conjunction with measuring of acceleration or deceleration and need not be described in further detail.

It will be apparent to those skilled in the art that the adjustment of the brake shoe and brake disk may be made subject to wide variation to simulate varying road conditions. A device of this type may include spring means and clutch facing depending upon the road conditions to be simulated. In this manner, the friction may be changed to simulate conditions involving dry roads to those involving wet roads and icy conditions.

The road marking device involving the establishing of lateral boundaries will be apparent by referring to the following details:

The two marking wheels 20 in contact with ink supply wheels 21 are supported in a movable bracket 61 which is adapted to slide laterally along transverse shaft 62. The bracket 61 is driven along its lateral excursion by means of a motor 63 coupled to an irregularly shaped cam 64 via cam follower 65 and push rod 66. The marking wheels and bracket are resiliently biased toward the cam by spring 67 which is confined between reference point 68 and the bracket 61.

As the motor 63 rotates cam 64, the bracket 61 with marking wheels is in oscillatory motion and causes a pair of lateral boundary marks on belt 16 thereby providing a road 70 defined between the markings. It will be apparent that depending upon the contours of the cam 64, the marked road can be changed from a simple straight road to a continuously curved road and that by changing the distance between the marking wheels, the road may be wide or narrow. Moreover, it will be observed that the road pattern is changing continuously and that if the cam contour is of sufficient length with respect to the linear length of the belt, the pattern is changing without establishing a repetitive pattern during a single revolution of the belt. If cam 64 is driven at a slow rate the problem presented to the trainee, having to confine object 15 within the lateral boundaries of the road, will be less difficult than when driving cam 64 at a high speed in which case the resultant road pattern will be changing more rapidly. When it is desired to repeat a certain road pattern in a repetitive manner, for instance for the initial phases of training or when simulating a short difficult road, it is obvious that the marking device may be disabled by lifting it away from the belt so that the pattern established on the belt will remain. In this event, it will be necessary to disable also the erasing means comprising brush, bath and blower means 21, 22, and 23 respectively of FIGURE 1. By providing a third marking wheel, disposed between the marking rollers 20 shown, a center-line of the road is achieved.

Figure 3:
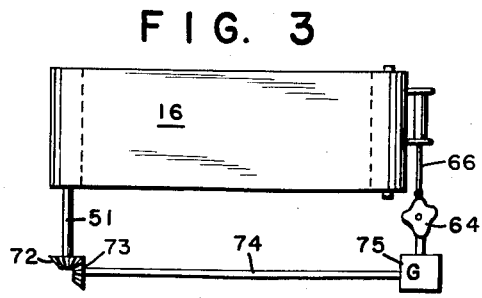
FIGURE 3 is a plan view, partly schematic, showing a modification of the drive for the lateral marking means depicted in FIGURE 2.

FIGURE 3 shows a variation and improvement of the apparatus shown in FIGURE 2.

When driving it will be apparent that the road pattern changes with speed to the extent that the time between a pair of curves is influenced by the driving speed. In order to effect the same condition cam 64 is coupled to the motion of the road belt. Drive shaft 51 driven via motor 31 drives belt 16 in the same manner as described above. Drive shaft 51, via a set of bevel gears 72 and 73, and shaft 74 is coupled to a gear mechanism 75 which drives cam 64. In this manner with no motion on drive shaft 51 there will be no motion on cam 64 and the faster the motion on shaft 51, the faster the rotation of cam 64. By providing variable gearing in gear box 75 the occurrence of difficult road patterns may be changed from a slow rate to a fast rate. It will be obvious that the same effect is achieved by controlling motor 63 (FIGURE 2) as a function of drive shaft 51.

FIGURE 4 discloses in detail the brake mechanisms indicated schematically in FIGURE 2. The brake pedal 48 is held in its outward position by means of a spring 101. When depressing brake pedal 48, motion is transmitted through linkage involving levers 102 and 103 to a toggle mechanism 104 which causes a brake band 105 to tighten around a brake lining 106 in contact with brake drum 107. Adjustable spring means 108 are provided to regulate the brake pressure which can be applied. It will be obvious that by changing the material used for brake lining and varying adjustable spring means 108, various conditions of road friction can readily be simulated.

Figure 5:
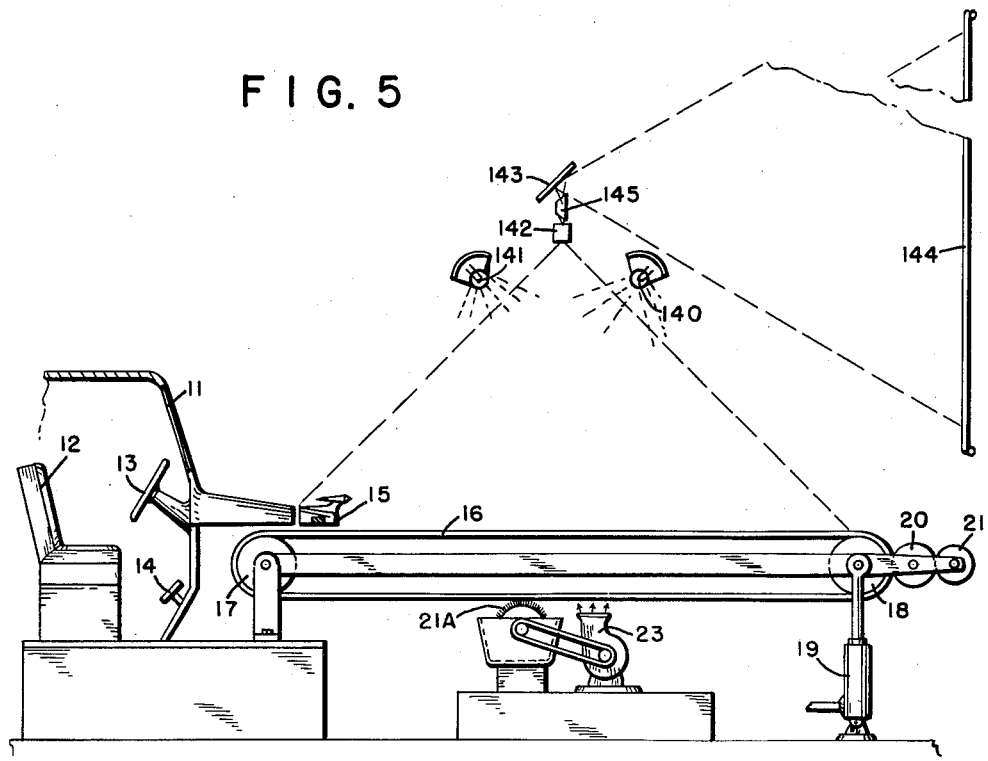
FIGURE 5 is a side view, partly schematic, of the training device provided additionally with projection means.

FIGURE 5 shows a variation of the general arrangement depicted in FIGURE 1 and provides projection means to project the terrain and object information onto a projection screen. A plurality of light sources 140 and 141 suitably illuminate the terrain means 16 and object 15. Lens means 142 disposed in view of the terrain means, via an inclined reflecting mirror 143 projects the terrain and object information onto projection screen 144 which is in view of the trainee position. A dove prism 145 is interposed in the optical path in order to rotate the projection axis as may be desired. In this manner a trainee seated in cab 11 receives the visual information from the projection screen 144.

It will be apparent that in a similar manner a transparent belt may be used with light disposed underneath the belt in order to effect suitable projection on a projection screen. Furthermore, a separate projector may be used to superimpose suitable background information on the projection screen 144 simultaneously with the running of a problem. The background information emanating from a separate projector may contain such information as scenery, other vehicles, stop lights, etc.

Figure 6:
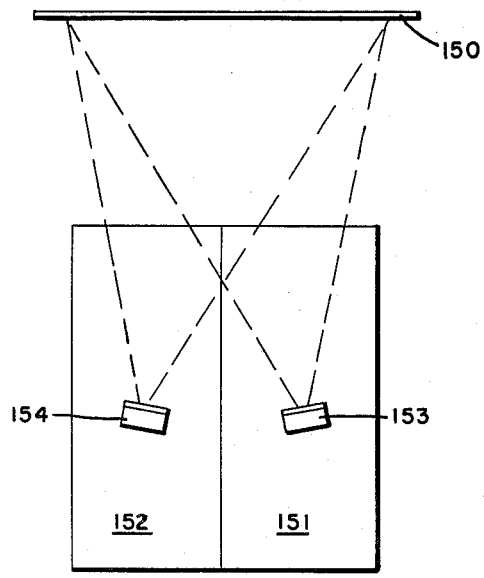
FIGURE 6 is a plan view, partly schematic, of two training devices side by side and using a common projection screen.

FIGURE 6 shows still another optical projection arrangement. A common projection screen 150 is employed for two training apparatus 151 and 152. It will be understood that either training apparatus is substantially the same as described in conjunction with FIGURES 1 and 2. The terrain and object information of each training device is in view of an associated lens system 153 and 154 respectively, and projects the associated image on common projection screen 150. Each projection system, 153 and 154 respectively, comprises a lens 142, dove prism 145 and reflecting mirror 143 as indicated in FIGURE 5. By providing polarized light sources and corresponding optical filters in front of the trainee's vision, each trainee will see only his associated terrain and object. In a similar manner red and green light sources may be used and green and red filter means respectively for the trainee in order to render only the associated information visible to the respective trainee.

When arranging two trainers side by side and by using only a single information presentaiton to the trainee, the instructor may be used in the other training apparatus. All or certain of the controls of both training apparatus may be coupled together so that the instructor may lead the trainee in a similar manner as such dual controls are available in dual-control automobiles used by many driving schools.

FIGURE 7 indicates the reversing mechanism which may be employed in order to teach backing of a vehicle. Cab 11 is provided with a mirror 161 which is disposed toward the rear of the seat 12 in somewhat the same general arrangement as the rear window in a vehicle. Mirror 161 receives road information and a view of the object 15 via inclined reflecting mirror 162. In order to provide realism as far as driving a car backward is concerned, it will be advantageous to shape object 15 in such a manner that the end of the object pointed toward the road could either represent the front or rear portion of an automobile so that the illusion of either forward or backward driving can be obtained without changing the object 15 itself.

FIGURES 8 and 9 are a side and plan view respectively of a further modification for providing illusion of distance and scenery. Numeral 170 identifies a screen which may be provided with proper scenery and background information. This screen is mounted at the far end of the apparatus and may be attached for instance to bracket 61. It will be apparent that this information may either be constant or may comprise a slowly changing picture without departing from the principle of the invention. Also, the picture may be provided by means of a projector.

While there have been shown certain specific features and embodiments of the present invention it will be apparent to those skilled in the art that various further and other modifications may be made therein without departing from the spirit and intent of the instant invention which shall be limited only by the scope of the appended claims.

What is claimed is:

1. A training device comprising a stationary trainee station; controls disposed at said trainee station; said controls including a steering, a speed and a brake control; an object simulating a portion of a vehicle positioned in view of said trainee station; terrain means visible at the trainee station and movable longitudinally with respect to said object; said object and said terrain means movable laterally with respect to one another in response to said steering control; said terrain means moving longitudinally in response to said speed and brake controls, and means for affixing erasable and changing lateral boundaries to said terrain means within which the object may be confined by means of said steering control.

2. In a training device of the type described, the combination of a trainee station and a terrain presentation, said terrain presentation comprising a flexible belt movable about spaced rollers, marking means disposed in proximity to said belt for affixing to said belt erasable markings, means coacting with said marking means to cause said markings to be shifted laterally along the length of the belt, and means disposed along a portion of said belt for erasing the markings provided by said marking means.

3. In a training device of the type described, the combination of a trainee station and a terrain presentation, said terrain presentation comprising a flexible belt movable about a set of spaced rollers for presenting to said trainee station a substantially level portion of terrain, means disposed in proximity to said belt for affixing thereto erasable markings which vary laterally along the length of the belt, and means disposed concealed from the trainee station and coacting with the belt for erasing the markings.

4. In a training device of the type described, the combination of a trainee station and a terrain presentation, said terrain presentation comprising an endless belt movable about a set of spaced rollers, marking means disposed along one portion of said belt for affixing to said belt erasable markings which represent a lateral boundary on said terrain, erasing means disposed at another portion of the belt for erasing said markings affixed to the belt after the terrain presentation has passed the trainee station, and means for tilting said terrain presentation relative to the trainee station.

5. In a training device of the type described and set forth in claim 3 wherein said erasable markings comprise discoloration affixed to the flexible belt.

6. A training device comprising: a trainee station; controls disposed at said trainee station; an object in view at said trainee station; a terrain means visible at the trainee station; said terrain means and object being movable relative to one another in response to the operation of the controls at said station; means for providing an erasable visual line on said terrain means, and said line providing a boundary for said object.

7. A training device comprising: a trainee station; controls disposed at said trainee station; an object in view at said trainee station; a terrain means visible at the trainee station; said terrain means and object being movable relative to one another in two dimensions in response to the operation of the controls at said station; means for providing an erasable visual line on said terrain means, and said line providing a boundary for said object.

8. A training device comprising: a trainee station; controls disposed at said trainee station; an object in view at said trainee station; a terrain means having a first portion visible at the trainee station and a second portion concealed from said trainee station; said terrain means and object being movable relative to one another in response to the operation of the controls at said station; means for providing erasable visual markings on said visible portion of said terrain means whereby said markings constitute a boundary for said object, and erasing means cooperating with the concealed portion of said terrain means for removing said markings.

References Cited in the file of this patent
UNITED STATES PATENTS

| | | |
|---|---|---|
| 1,240,629 | Torr | Sept. 18, 1917 |
| 2,148,828 | Myers | Feb. 28, 1939 |
| 2,265,598 | Firestone et al. | Dec. 9, 1941 |
| 2,269,444 | Durham et al. | Jan. 13, 1942 |
| 2,273,091 | De Silva | Feb. 17, 1942 |
| 2,336,436 | Beindorf | Dec. 7, 1943 |
| 2,475,314 | Dehmel | July 5, 1949 |
| 2,659,164 | Durham | Nov. 17, 1953 |
| 2,700,227 | Arkell et al. | Jan. 25, 1955 |
| 2,716,193 | Riolo | Aug. 23, 1955 |
| 2,742,714 | Allgaier | Apr. 24, 1956 |

FOREIGN PATENTS

| | | |
|---|---|---|
| 747,274 | France | Mar. 28, 1933 |
| 545,795 | Germany | Mar. 5, 1936 |
| 322,268 | Great Britain | Dec. 5, 1929 |
| 452,735 | Great Britain | Aug. 28, 1936 |
| 714,921 | Great Britain | Sept. 8, 1954 |